US006274664B1

(12) United States Patent
Emery et al.

(10) Patent No.: US 6,274,664 B1
(45) Date of Patent: Aug. 14, 2001

(54) DYE-TRANSFER-INHIBITING COMPOSITIONS AND PARTICULATE DETERGENT COMPOSITIONS CONTAINING THEM

(75) Inventors: Derek William Emery; Neil Jones, both of Merseyside (GB); Hendrik de Ruijter; Antonius Henricus J Strijbosch, both of Vlaardingen (NL)

(73) Assignee: Unilever Home & Personal Care USA, division of Conopco, Inc., Greenwich, CT (US)

( * ) Notice: Subject to any disclaimer, the term of this patent is extended or adjusted under 35 U.S.C. 154(b) by 0 days.

(21) Appl. No.: 09/350,064

(22) Filed: Jul. 8, 1999

(30) Foreign Application Priority Data

Jul. 8, 1998 (GB) .................................................. 9814822

(51) Int. Cl.[7] ................................ C08J 5/10; C08K 3/34; C08L 25/18

(52) U.S. Cl. .......................... 524/492; 524/493; 524/494; 523/207; 523/210

(58) Field of Search .................................... 524/492, 493, 524/494, 495, 496; 523/210, 207

(56) References Cited

U.S. PATENT DOCUMENTS

| | | | | |
|---|---|---|---|---|
| 3,053,627 | * | 9/1962 | Flemmert | 23/182 |
| 3,901,874 | * | 8/1975 | Hill | 260/209.5 |
| 5,259,994 | | 11/1993 | Welch et al. | 252/542 |
| 5,776,879 | | 7/1998 | Shih et al. | 510/361 |
| 5,863,880 | | 1/1999 | Shih et al. | 510/361 |
| 5,869,442 | | 2/1999 | Srinivas et al. | 510/476 |
| 6,057,072 | * | 5/2000 | Guistina et al. | 430/106 |
| 6,117,834 | | 9/2000 | Ruijter et al. | 510/475 |

FOREIGN PATENT DOCUMENTS

| | | |
|---|---|---|
| 677 580 | 10/1995 | (EP) . |
| 95/20030 | 7/1995 | (WO) . |
| 98/28397 | 7/1998 | (WO) . |
| 99/15614 | 4/1999 | (WO) . |

OTHER PUBLICATIONS

PCT Search Report; International Application PCT/EP99/04735.

Research Disclosure 41175 "Detergent compositions and fabric conditioning compositions containing dye transfer inhibiting polymers" Research Disclosure 411 Jul. 1998.

* cited by examiner

*Primary Examiner*—Samuel A. Acquah
*Assistant Examiner*—U. K. Rajguru
(74) *Attorney, Agent, or Firm*—Rimma Mitelman

(57) ABSTRACT

A free-flowing granular polymer composition suitable for incorporation into a particulate detergent composition comprises a defined dye-transfer-inhibiting polymer, preferably poly(4-vinylpyridine) sodium carboxymethyl betaine chloride, and a silica-based carrier material. A preferred carrier material is an acidic silica. The silica-based carrier material may optionally comprise a solid acid, for example, polyacrylic acid or phthalic acid.

15 Claims, No Drawings

DYE-TRANSFER-INHIBITING COMPOSITIONS AND PARTICULATE DETERGENT COMPOSITIONS CONTAINING THEM

TECHNICAL FIELD

The present invention is concerned with granular compositions containing a dye-transfer-inhibiting polymer, for use in particulate detergent compositions.

BACKGROUND AND PRIOR ART

The use of various polymers as dye transfer inhibitors (DTIs) in laundry detergent compositions and rinse conditioners has been described in the prior art. Examples of well-known polymers include polyvinyl pyrrolidone (PVP), and copolymers of N-vinylpyrrolidone and N-vinylimidazole (PVP/PVI), available commercially from BASF, Ludwigshafen, Germany as Sokalan (Trade Mark) HPSO and HP56 respectively.

The polymers may be incorporated into particulate detergent compositions directly, for example, as a solution or dispersion, or by dry-mixing powdered polymer with other particulate components. However, the dry-mixing method can lead to deterioration of powder properties, for example, loss of flow and caking, resulting in poor product dispensing into the wash. Powdered polymers can also be difficult to handle.

Alternatively, the polymer may be premixed or granulated with an inert carrier material or another detergent ingredient before incorporation into the detergent composition.

EP 677 580A (Procter & Gamble) discloses a free-flowing powder of high bulk density which contains 5 to 50% by weight of a PVP/PVI polymer and 20 to 95% by weight of a detergent ingredient selected from aluminosilicate, citrate, silica, carbonate, bicarbonate, silicate, sulphate, phosphate, and water-soluble polymers. The preferred and exemplified detergent ingredient is zeolite 4A.

The present invention is concerned with a granular polymer composition containing a different, novel and highly effective dye-transfer-inhibiting polymer. The novel polymer, supplied as an aqueous solution, displays a tendency to discolour on storage; and if spray-dried gives very hygroscopic granules. The granular polymer composition of the invention simultaneously solves the discolouration problem and provides a convenient method for incorporating the polymer into a particulate detergent composition without handling difficulties and without having a detrimental effect on powder properties.

DEFINITION OF THE INVENTION

The present invention accordingly provides a free-flowing granular polymer composition suitable for incorporation in a particulate detergent composition, the granular polymer composition comprising:

(a) a dye-transfer-inhibiting polymer having the general formula I:

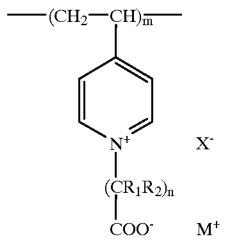

wherein m indicates the degree of polymerisation,

X is an anion, $R_1$ and $R_2$ are independently hydrogen, alkyl or aryl, n is an integer within the range of from 1 to 5, and M is a cation;

(b) a carrier material comprising a silica.

The Dye-transfer-inhibiting Polymer

The dye transfer inhibiting (DTI) polymers with which this invention is concerned are water-soluble poly (vinylpyridine betaines) containing a quaternary nitrogen and a carboxylate group. These polymers exhibit particularly effective DTI properties even in the presence of anionic surfactants.

The polymers have the general formula I given above.

Preferred polymers are those in which:

X is a halide, most preferably Cl or Br;

$R_1$ and $R_2$ are both hydrogen;

n is 1,

M is alkali metal, most preferably Na or K;

and the polymer is 25–100% quaternised, preferably 75–100% quaternised.

Preferred polymers have a weight average molecular weight of about 5,000 to 1,000,000, preferably 20,000 to 200,000; where m is about 30 to 5,000, preferably 100 to 1,000.

An especially preferred polymer is poly(4-vinylpyridine) sodium carboxymethyl betaine chloride, having the formula II below, which is arrived at from formula I when n=1, $R_1$ and $R_2$ are both hydrogen, X=Cl and M=Na.

Specifically, samples of polymer having degrees of quaternisation of 100%, 75% and 50% have been found to have a high level of DTI effectiveness.

Formula II

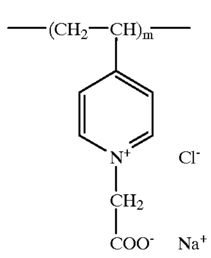

Also of interest are copolymers in which the 4-vinylpyridine (VPy) monomer is partially replaced by other polymerisable dye-binding monomers. Preferred dye-binding comonomers are nitrogen-containing heterocycles.

Preferred comonomers include vinyl pyrrolidone (VP), vinyl imidazole (VI), acrylamide, vinyl caprolactam, vinyl azlactone, vinyl azlactam, methyl vinyl imidazole (MeVI), vinyl pyridine-N-oxide (VPy-N-O), vinyl oxazolidone.

Especially preferred comonomers are vinyl pyrrolidone (VP) and vinyl imidazole (VI).

Examples of Such Polymers Include:

- a copolymer in which the 4-vinyl pyridine (VPy) monomer is partially replaced by vinyl pyrrolidone (VP) at a ratio of VPy to VP of 50:50, 100% quaternised;
- a copolymer in which the 4-vinyl pyridine (VPy) monomer is partially replaced by vinyl pyrrolidone (VP) at a ratio of VPy to VP of 25:75, 100% quaternised.

In addition to or instead of dye-binding comonomers, other comonomers, for example, acrylic-type monomers, may be included, in order to confer additional water solubility or to provide other benefits.

As previously indicated, it has been found that these highly effective DTI polymers, supplied in aqueous solution form, can show a tendency to become discoloured if stored in an alkaline environment, such as obtains in a laundry detergent composition. Furthermore, if the polymer solution is spray-dried, very hygroscopic granules result. The polymers cannot, therefore, readily be incorporated as such into a particulate laundry detergent composition.

The present invention solves both these problems simultaneously by providing a composition in granular form in which the polymer is present together with a silica-based carrier material.

The Silica-based Carrier Material

The carrier material is based on a silica. It has been found that certain silicas are effective to give light-coloured granules of high storage stability, while others are less effective. Without wishing to be bound by theory, it is believed that the silicas that are most effective are acidic, or have a low iron content, or both.

The silica on which the carrier material is based preferably has a 5% solution pH not exceeding 6.0, more preferably not exceeding 5.0. Preferably the silica has a 5% solution pH within the range of from 2.0 to 8.0, more preferably from 2.0 to 6.0 and most preferably from 3.0 to 5.0.

Alternatively or additionally, the silica may preferably have an iron content (maximum) of less than 200 ppm, more preferably less than 150 ppm. Preferably the iron content (as Fe) is from 50 to 200 ppm, more preferably from 50 to 150 ppm.

The contents of other transition metals, for example, titanium, chromium and manganese, may also play a significant role.

5% solution pH values and iron contents for some commercially available silicas are shown below (* denotes Trade Mark). Most other Crosfield commercial silicas have pH values within the 6.0 to 7.0 range.

Values for a commercially available finely divided aluminosilicate, Alusil* ET, are also shown.

| | Manufacturer | pH (5% solution) | Fe content (ppm, max) |
|---|---|---|---|
| Gasil* 200TP | Crosfield | 3.2–5.0, average 4.5 | 140 |
| Gasil* AB720 | Crosfield | 5.5–7.5 | 80 |
| Sorbosil* TC15 | Crosfield | 5.5–7.5, average 6.3 | 420 |
| Sipernat* 50 | Degussa | 5.0–7.0 | 230 |
| Alusil* ET | Crosfield | 11.0 | 415 |

Both precipitated and gelled silicas may be suitable for use as carrier materials in the polymer granules of the present invention.

The most preferred silicas for use in the present invention are Gasil* 200TP and Gasil* AB720.

These silicas may be used alone as carrier materials for DTI polymers in granules according to the present invention.

Advantageously, the silica-based carrier material may also comprise a solid organic, or inorganic acid. If a solid acid is present, a silica material that does not intrinsically have a low pH may be used. Thus the use of a solid acid enables silicas that are not effective alone, for example, Sorbosil* TC15, to be used as carriers in the granular polymer compositions of the present invention.

Solid organic acids are preferred. The acid may be monomeric or polymeric. Examples of solid organic acids include:

- aliphatic dicarboxylic acids, for example, adipic acid;
- aromatic dicarboxylic acids, for example, phthalic acid;
- polymeric polycarboxylic acids, for example, polyacrylic acid.

An especially preferred carrier material of this type is a Gasil* silica in conjunction with polyacrylic acid.

Advantageously, the solid organic acid forms a coating or partial coating on the granules.

Examples of solid inorganic acids include boric acid, sodium hydrogen sulphate, disodium hydrogen orthophosphate.

The granular polymer composition of the invention may suitably contain the following percentages of the various ingredients:

| | |
|---|---|
| DTI polymer | 5 to 50, preferably 10 to 30 |
| Silica | 20 to 95, preferably 30 to 90 |
| Polymeric acid | 0 to 15, preferably 2 to 10 |
| or | |
| Monomeric acid | 0 to 60, preferably 20 to 50 |

If desired, the granular polymer composition may also contain titanium dioxide in order further to increase whiteness.

Preparation of the Granular Polymer Composition

The DTI polymer is supplied as an aqueous solution. The granular polymer composition may be prepared by mixing and granulating the DTI polymer solution and the silica, plus the solid acid if applicable, in a suitable mixer or granulator which provides shear. Suitable mixers are high speed mixer/granulators such as the Fukae* batch high speed mixer/granulators and the Lödige* continuous high speed mixer/granulators.

The resulting granules may optionally be dried using fluid bed drying at low air inlet temperatures.

When a solid organic acid is used, it may be especially advantageous to carry out a two stage process in which the silica and polymer are initially granulated together, and then the resulting granules mixed separately with the solid organic acid, so that the solid organic acid forms a coating or partial coating on the granules. This process is especially effective if the solid organic acid is a polymeric acid such as polyacrylic acid.

It is believed that a full coating or even encapsulation might be especially beneficial.

Titanium dioxide, if used, may be incorporated during the granulation, or subsequently applied or "layered" onto the finished granules as a coating or outer layer.

Detergent Compositions

The granular polymer compositions described above may be incorporated in particulate laundry detergent compositions, suitably in an amount equivalent to a content of the DTI polymer itself of from 0.01 to 10 wt %, preferably from 0.02 to 5 wt %, more preferably from 0.03 to 2 wt %.

The term "particulate laundry detergent composition" used in this specification includes powders or granular products of any bulk density, and also tablets of compacted powder.

A particulate laundry detergent composition in accordance with the present invention may suitably comprise:

(a) from 5 to 60 wt % of one or more organic detergent surfactants, (b) optionally from 0 to 80 wt % of detergency builder, (c) optionally other detergent ingredients, (d) a granular polymer composition as defined above, in an amount equivalent to a content of the polymer itself of from 0.01 to 10 wt %, preferably from 0.02 to 5 wt %, more preferably from 0.03 to 2 wt %.

The detergent compositions will contain, as essential ingredients, one or more detergent active compounds (surfactants) which may be chosen from soap and non-soap anionic, cationic, nonionic, amphoteric and zwitterionic detergent active compounds, and mixtures thereof. Many suitable detergent active compounds are available and are fully described in the literature, for example, in "Surface-Active Agents and Detergents", Volumes I and II, by Schwartz, Perry and Berch.

The preferred detergent active compounds that can be used are soaps and synthetic non-soap anionic and nonionic compounds.

Anionic surfactants are well-known to those skilled in the art. Examples include alkylbenzene sulphonates, particularly linear alkylbenzene sulphonates having an alkyl chain length of $C_8$–$C_{15}$; primary and secondary alkylsulphates, particularly $C_8$–$C_{15}$ primary alkyl sulphates; alkyl ether sulphates; olefin sulphonates; alkyl xylene sulphonates; dialkyl sulphosuccinates; and fatty acid ester sulphonates. Sodium salts are generally preferred.

Nonionic surfactants that may be used include the primary and secondary alcohol ethoxylates, especially the $C_8$–$C_{20}$ aliphatic alcohols ethoxylated with an average of from 1 to 20 moles of ethylene oxide per mole of alcohol, and more especially the $C_{10}$–$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

Cationic surfactants that may be used include quaternary ammonium salts of the general formula $R_1R_2R_3R_4N^+ X^-$ wherein the R groups are long or short hydrocarbyl chains, typically alkyl, hydroxyalkyl or ethoxylated alkyl groups, and X is a solubilising cation (for example, compounds in which $R_1$ is a $C_8C_{22}$ alkyl group, preferably a $C_8$–$C_{10}$ or $C_{12}$–$C_{14}$ alkyl group, $R_2$ is a methyl group, and $R_3$ and $R_4$, which may be the same or different, are methyl or hydroxyethyl groups); and cationic esters (for example, choline esters).

The total quantity of detergent surfactant in the composition is suitably from 5 to 60 wt %.

Preferably, the quantity of anionic surfactant is in the is range of from 5 to 50% by weight of the total composition. More preferably, the quantity of anionic surfactant is in the range of from 8 to 35% by weight.

The new DTI polymers have proved more effective than previously known polymers in detergent compositions containing anionic surfactants.

Preferably, the quantity of nonionic surfactant is in the range of from 2 to 25% by weight, more preferably from 5 to 20% by weight.

The compositions may also contain a detergency builder, although unbuilt compositions are also within the scope of the invention. The compositions may suitably contain from 10 to 80%, preferably from 15 to 70% by weight, of detergency builder. Preferably, the quantity of builder is in the range of from 15 to 50% by weight.

The detergent composition may contain as builder a crystalline aluminosilicate, preferably an alkali metal aluminosilicate, more preferably a sodium aluminosilicate.

The aluminosilicate may generally be incorporated in amounts of from 10 to 70% by weight (anhydrous basis), preferably from 25 to 50%. Aluminosilicates are materials having the general formula:

$$0.8\text{–}1.5\ M_2O.\ Al_2O_3.\ 0.8\text{–}6\ SiO_2$$

where M is a monovalent cation, preferably sodium. These materials contain some bound water and are required to have a calcium ion exchange capacity of at least 50 mg CaO/g. The preferred sodium aluminosilicates contain 1.5–3.5 $SiO_2$ units in the formula above. They can be prepared readily by reaction between sodium silicate and sodium aluminate, as amply described in the literature.

The zeolite used as a builder may be the commercially available zeolite A (zeolite 4A) now widely used in laundry detergent powders. Alternatively, the zeolite may be maximum aluminium zeolite P (zeolite MAP) as described and claimed in EP 384 070B (Unilever), and commercially available as Doucil (Trade Mark) A24 from Crosfield Chemicals Ltd, UK. Zeolite MAP is defined as an alkali metal aluminosilicate of zeolite P type having a silicon to aluminium ratio not exceeding 1.33, preferably within the range of from 0.90 to 1.33, preferably within the range of from 0.90 to 1.20, especially preferred is zeolite MAP having a silicon to aluminium ratio not exceeding 1.07, more preferably about 1.00. The calcium binding capacity of zeolite MAP is generally at least 150 mg CaO per g of anhydrous material.

The particle size of the zeolite is not critical. Zeolite A or zeolite MAP of any suitable particle size may be used.

As well as the crystalline aluminosilicate builders already mentioned, other inorganic or organic builders may be present. Inorganic builders that may be present include sodium carbonate, layered silicate, amorphous aluminosilicates, and phosphate builders, for example, sodium orthophosphate, pyrophosphate and tripolyphosphate. Organic builders that may additionally be present include polycarboxylate polymers such as polyacrylates and acrylic/maleic copolymers; polyaspartates; monomeric polycarboxylates such as citrates, gluconates, oxydisuccinates, glycerol mono-di- and trisuccinates, carboxymethyloxysuccinates, carboxymethyloxymalonates, dipicolinates, hydroxyethyliminodiacetates, alkyl- and alkyenylmalonates and succinates; and sulphonated fatty acid salts.

Especially preferred organic builders are citrates, suitably used in amounts of from 5 to 30 wt %, preferably from 10 to 25 wt %; and acrylic polymers, more especially acrylic/maleic copolymers, suitably used in amounts of from 0.5 to 15 wt %, preferably from 1 to 10 wt %.

Builders, both inorganic and organic, are preferably present in alkali metal salt, especially sodium salt, form.

The detergent composition may contain crystalline or amorphous water-soluble alkali metal silicate, preferably sodium silicate having a $SiO_2$:$Na_2O$ mole ratio within the range of from 1.6:1 to 4:1, 2:1 to 3.3:1.

The water-soluble silicate may be present in an amount of from 1 to 20 wt %, preferably 3 to 15 wt % and more preferably 5 to 10 wt %, based on the total composition.

The detergent compositions may also suitably contain a bleach system. The compositions may contain peroxy bleach compounds capable of yielding hydrogen peroxide in aqueous solution, for example inorganic or organic peroxyacids, and inorganic persalts such as the alkali metal perborates, percarbonates, perphosphates, persilicates and persulphates.

The sodium percarbonate may have a protective coating against destabilisation by moisture. Sodium percarbonate having a protective coating comprising sodium metaborate and sodium silicate is disclosed in GB 2 123 044 (Kao). The peroxy bleach compound, for example sodium percarbonate, is suitably present in an amount of from 5 to 35 wt %, preferably from 10 to 25 wt %.

The peroxy bleach compound, for example sodium percarbonate, may be used in conjunction with a bleach activator (bleach precursor) to improve bleaching action at low wash temperatures. The bleach precursor is suitably present in an amount of from 1 to 8 wt %, preferably from 2 to 5 wt %.

Preferred bleach precursors are peroxycarboxylic acid precursors, more especially peracetic acid precursors, pernonanoic acid precursors and peroxybenzoic acid precursors.

Especially preferred bleach precursors are N,N,N',N.-tetracetyl ethylenediamine (TAED) and sodium noanoyloxybenzene sulphonate (SNOBS). The novel quaternary ammonium and phosphonium bleach precursors disclosed in U.S. Pat. No. 4,751,015 and U.S. Pat. No. 4,818,426 (Lever Brothers Company) and EP 402 971A (Unilever), and the cationic bleach precursors disclosed in EP 284 292A and EP 303 520A (Kao) are also of interest.

The bleach system can be either supplemented with or replaced by a peroxyacid. Examples of such peracids can be found in U.S. Pat. No. 4,686,063 and U.S. Pat. No. 5,397,501 (Unilever). A preferred example is the imidoperoxycarboxylic class of peracids described in EP 325 288A, EP 349 940A, DE 3 823 172A and EP 325 289A. A particularly preferred example is phthalimido peroxy caproic acid (PAP). Such peracids are suitably present at levels of from 0.1 to 12%, preferably from 0.5 to 10%.

A bleach stabiliser (heavy metal sequestrant) may also be present. Suitable bleach stabilisers include ethylenediamine tetraacetate (EDTA), the aminopolyphosphonates such as Dequest (Trade Mark), for example, ethylenediamine tetramethylene phosphonate (EDTMP) and diethylenetriamine pentamethylene phosphonate (DETPMP), and non-phosphate stabilisers such as EDDS (ethylene diamine disuccinate). These bleach stabilisers are also useful for stain removal especially in products containing low levels of bleaching species or no bleaching species.

The compositions may also contain soil release polymers, for example sulphonated and unsulphonated PET/POET polymers, both end-capped and non-end-capped, and polyethylene glycol/polyvinyl alcohol graft copolymers such as Sokolan (Trade Mark) HP22.

The detergent compositions may also contain one or more enzymes. Suitable enzymes include the proteases, amylases, cellulases, oxidases, peroxidases and lipases usable for incorporation in detergent compositions.

Preferred proteolytic enzymes (proteases) are catalytically active protein materials which degrade or alter protein types of stains when present as in fabric stains in a hydrolysis reaction. They may be of any suitable origin, such as vegetable, animal, bacterial or yeast origin.

Proteolytic enzymes or proteases of various qualities and origins and having activity in various pH ranges of from 4–12 are available. Proteases of both high and low isoelectric point are suitable.

Other enzymes that may suitably be present include lipases, amylases, and cellulases including high-activity cellulases such as *Carezyme.

Detergency enzymes are commonly employed in granular form in amounts of from about 0.1 to about 3.0 wt %. However, any suitable physical form of enzyme may be used.

The compositions may advantageously contain a powder structurant, for example, a fatty acid (or fatty acid soap), a sugar, an acrylate or acrylate/maleate polymer. A preferred powder structurant is fatty acid soap, suitably present in an amount of from 1 to 5 wt %.

Sodium carbonate may advantageously be present. This has the advantage that it provides powder structuring, acts to control the pH of the detergent composition when dissolved and acts as a builder. Preferably 5 to 30% by weight of sodium carbonate are present. Minor ingredients such as layering agents (for example zeolite, *Alusil or clay) may be present, for example, at a level of from 0.1 to 10%.

Other materials that may be present in detergent compositions according to the invention include antiredeposition agents such as cellulosic polymers; fluorescers; photobleaches; inorganic salts such as sodium sulphate; foam control agents or foam boosters as appropriate; dyes; coloured speckles; perfumes; and fabric conditioning compounds.

The compositions may be of any bulk density and may be prepared by spray-drying, non-tower granulation or any combination of these techniques. Tablets may be prepared from such powders by any suitable tabletting technique.

The detergent compositions when diluted in the wash liquor (during a typical wash cycle) will typically give a pH of the wash liquor from 6 to 11, more typically from 7 to 10.5.

The DTI polymers with which the present invention is concerned are especially suitable for incorporation in laundry detergent compositions intended for washing delicate fabrics, and specifically non-bleaching compositions generating a wash liquor of low pH. The 1 wt % solution pH at 250° C. in demineralised water of such compositions generally does not exceed 10.5, preferably does not exceed 10, and more preferably lies within the range of from 9.5 to 10. Even lower pH values, below 9.5, may also be contemplated.

Such compositions may advantageously also possess one or more of the following characteristics:

- absence, or an extremely low level, of fluorescer;
- presence of a polycarboxylate polymer, for example, an acrylic/maleic copolymer such as Sokalan (Trade Mark) CP5 ex BASF;
- presence of a heavy metal sequestrant, for example, aminomethylenephosphonic acids and salts such as ethylenediamine tetramethylene phosphonate (EDTMP) and its salts, and diethylenetriamine pentamethylene phosphonate (DETPMP) and its salts;
- presence of at least two different enzymes.

However, as indicated previously, the scope for use of the DTI polymers is not restricted to compositions of this type but extends over the whole range of heavy and light duty laundry compositions.

EXAMPLES

The invention will now be illustrated in more detail by the following non-limiting Examples, in which parts and percentages are by weight unless otherwise stated.

The Examples identified by numbers illustrate the invention, while those identified by letters are comparative.

In all examples, the DTI polymer used was poly(4-vinylpyridine) sodium carboxymethyl betaine chloride having the formula II given previously.

Laboratory scale granulation was carried out using a Moulinette* kitchen mixer ex Moulinex, France.

Storage testing was carried out using open containers at 37° C. and 70% relative humidity, samples being examined after 9 days or after 14 days.

For storage testing, detergent powder compositions were used as follows:

| | Detcomp1 | Detcomp2 |
|---|---|---|
| Sodium linear alkylbenzene sulphonate | 7.9 | 9.4 |
| Nonionic surfactants | 8.0 | 4.2 |
| Soap/fatty acid | 0.8 | 0.6 |
| Acrylic/maleic copolymer | 1.4 | 1.2 |
| Sodium carboxymethylcellulose 68% | 0.4 | 0.3 |
| Sodium tripolyphosphate | 30.0 | 23.9 |
| Sodium disilicate | 7.9 | 6.3 |
| Sodium sulphate | 14.5 | 9.3 |
| Sodium carbonate | 8.9 | 8.5 |
| Sodium bicarbonate | 4.0 | — |
| Enzymes (protease/lipase/amylase) | 0.7 | 0.7 |
| Sodium perborate tetrahydrate | — | 20.0 |
| TAED granules | — | 2.2 |
| EDTMP (Dequest* 2047) | — | 0.6 |
| Antifoam granule | 1.2 | 1.5 |
| Soil release polymer granule | 1.2 | 1.2 |
| Fluorescer granule | — | 0.6 |
| Perfume, minor ingredients, water | to 100 | to 100 |

Detcomp1 a non-bleaching formulation
Detcomp2 a bleaching formulation

Examples 1 and 2, Comparative Examples A to C

Comparison of Various Silicas and other Carrier Materials

The granular polymer compositions shown below were prepared using the Moulinette mixer.

| Example | 1 | 2 | A | B | C |
|---|---|---|---|---|---|
| DTI polymer | 24.8 | 23.4 | 22.6 | 54.4 | 52.4 |
| Carrier material: | | | | | |
| Gasil AB720 | 74.9 | | | | |
| Gasil 200TP | | 66.4 | | | |
| Alusil ET | | | 53.2 | | |
| Sipernat 50 | | | | 38.6 | |
| Sorbosil TC15 | | | | | 44.5 |
| Water | 0.3 | 10.2 | 24.2 | 7.0 | 3.1 |

The granules were incorporated at 2.5 wt % into detergent powder compositions Detcompl (non-bleaching) and Detcomp2 (bleaching) and 20 g samples of each powder were stored for 9 days as described above. The samples were then inspected visually for the development of discoloured granules as speckles, the results being shown below.

| | Detcomp1 | Detcomp2 |
|---|---|---|
| 1 | No change | No change |
| 2 | Slight brownish/black speckles | No change |
| A | Brownish/black speckles | Brownish/black speckles |
| B | Brownish/black speckles | Brownish/black speckles |
| C | Brownish/black speckles | Brownish/black speckles |

Examples 3 to 6

Granules Containing Phthalic Acid

Granules having the compositions shown below were prepared as described in Examples 1 and 2, the DTI polymer solution, the silica and the phthalic acid being mixed together in the Moulinette mixer.

9-day storage tests were carried out as described previously and the results are shown below.

| | Granule compositions | | | |
|---|---|---|---|---|
| Example | 3 | 4 | 5 | 6 |
| DTI polymer | 8.3 | 15.1 | 20.7 | 30.8 |
| Carrier material: | | | | |
| Gasil AB720 | 45.5 | | | |
| Gasil 200TP | | 39.0 | | |
| Alusil ET | | | 30.0 | |
| Sorbosil TC15 | | | | 27.1 |
| Phthalic acid | 45.4 | 39.0 | 30.0 | 27.1 |
| Water | 0.7 | 6.9 | 19.3 | 15.0 |

| | Storage results | |
|---|---|---|
| | Detcomp1 | Detcomp2 |
| 3 | No change | No change |
| 4 | Some brownish/black speckles | No change |
| 5 | Some brownish/black speckles | No change |
| 6 | Some brownish/black speckles | Some yellowish speckles |

Examples 7 to 11

Granules Containing Gasil 200TP

Using a different batch of polymer, granules were prepared to the formulations given below (% based on anhydrous material), in the Moulinette mixer.

| Example | 7 | 8 | 9 | 10 | 11 |
|---|---|---|---|---|---|
| DTI polymer | 15.0 | 9.7 | 10.9 | 20.0 | 11.3 |
| Gasil 200TP | 85.0 | 54.2 | 85.4 | 80.0 | 79.2 |
| Adipic acid | | 36.1 | | | |
| Polyacrylic acid | | | 3.7 | | 9.5 |

In Examples 9 and 11 the polyacrylic acid was added separately, subsequently to the main granulation.

In Examples 10 and 11, granulation took place over three stages with some intermediate oven drying of the sample, allowing a higher polymer level to be achieved.

14-day storage tests were carried out using 5% of each granule in Detcompl. Two different visual assessments were made: the approximate percentage of the granules that were coloured, and (via the optical microscope) the colour of any discoloured granules.

| | Percentage of discoloured granules | Colour of discoloured granules |
|---|---|---|
| 7 | None | — |
| 8 | None | — |
| 9 | None | — |
| 10 | Very few | Beige |
| 11 | Very few | Beige |

These granules were subjected to a further test to simulate to what extent detergent powders containing these granules would discolour in the dispenser drawer of a drum-type front-loading washing machine.

Granules were mixed, using a rollerbed, into 20 g samples of Detcomp1 in amounts corresponding to 0.2 wt % of the DTI polymer in the final formulation. Each 20 g sample was split into 2 10 g samples in plastic weighing boats, 5 ml of tap water (West Wirral water) was added to form a slurry, the samples were left to stand and any colour developing was recorded.

After drying over 2 days the samples were split into sets and presented to a group of panellists who were asked to rank each set against a control containing Detcompl and Gasil 200TP only, taking into account number and colour of speckles and overall powder colour. The results, averaged over all panellists, were as follows, the highest preference being indicated by the lowest number (1).

| Example | % DTI polymer content | Ingredients of granule | Average panellist ranking |
|---|---|---|---|
| Control | 0 | Gasil | 1 |
| 7 | 15.0 | Gasil/polymer | 2.8 |
| 9 | 10.9 | Gasil/polyacrylic acid/polymer | 3.4 |
| 10 | 20.0 | Gasil/polymer | 3.8 |
| 11 | 11.3 | Gasil/polyacrylic acid/polymer | 4 |
| 8 | 9.7 | Gasil/adipic acid/polymer | 6 |

These results indicated a preference for Gasil-alone or Gasil/polyacrylic acid carriers over Gasil/adipic acid carriers.

Examples 12 to 14

More granules containing the acidic silica, Gasil 200TP, were prepared using a different, particularly dark, batch of polymer. These examples show how the use of an acid in addition to an acidic silica can improve granule colour when the polymer is very discoloured.

| Example | 12 | 13 | 14 |
|---|---|---|---|
| DTI polymer | 18.6 | 11.6 | 11.4 |
| Gasil 200TP | 81.4 | 44.2 | 44.3 |
| Adipic acid | | 44.2 | |
| Phthalic acid | | | 44.3 |

14-day storage results were as follows:

| | Percentage of coloured granules | Colour of coloured granules |
|---|---|---|
| 12 | About 100% | Brown/beige/yellow |
| 13 | About 50% | Beige/yellow |
| 14 | About 50% | Beige/yellow |

These granules were subjected to the simulated dispenser drawer panel test described previously.

| Example | % DTI polymer content | Ingredients of granule | Average panellist ranking |
|---|---|---|---|
| Control | 0 | Gasil | 1 |
| 12 | 18.6 | Gasil/polymer | 2 |
| 13 | 11.6 | Gasil/adipic acid/polymer | 3 |
| 14 | 11.4 | Gasil/phthalic acid/polymer | 4 |

TRANSITION METAL CONTENT

The contents (ppm) of acid-soluble transition metals of the granules of Examples 7 and 12 (both containing Gasil 200TP as carrier) were as follows:

| Example | Polymer content | Ti | Cr | Mn | Fe |
|---|---|---|---|---|---|
| 7 | 15.0 | 49 | 0.4 | 0.2 | 34 |
| 12 | 18.6 | 45 | 0.7 | 0.2 | 31 |

Examples 15 to 21

Using a different batch of polymer, granules were prepared and panel tested. In Examples 20 and 21, a less acidic but highly absorbent silica was used to allow exceptionally high polymer loadings.

| Example | 15 | 16 | 17 | 18 | 19 | 20 | 21 |
|---|---|---|---|---|---|---|---|
| DTI polymer | 20.8 | 20.9 | 16.6 | 24.8 | 19.5 | 45.4 | 37.2 |
| Gasil 200TP | 79.2 | 52.7 | 79.9 | 75.2 | 76.6 | | |
| Sorbosil | | | | | | 52.3 | 53.7 |
| Adipic acid | | 26.4 | | | | | |
| Polyacrylic acid | | | 3.5 | | 3.9 | 2.4 | 9.1 |

| Example | % DTI polymer content | Ingredients of granule | Average panellist ranking |
|---|---|---|---|
| Control | 0 | Gasil | |
| 17 | 16.6 | Gasil/polyacrylic acid/polymer | 1.8 |
| 15 | 20.8 | Gasil/polymer | 2 |
| 19 | 19.5 | Gasil/polyacrylic acid/polymer | 2.8 |
| 18 | 24.8 | Gasil/polymer | 3.4 |
| 20 | 45.4 | Sorbosil/ polyacrylic acid/polymer | 5.6 |
| 16 | 20.9 | Gasil/adipic acid/polymer | 5.8 |

-continued

| Example | % DTI polymer content | Ingredients of granule | Average panellist ranking |
|---|---|---|---|
| 21 | 37.2 | Sorbosil/ polyacrylic acid/polymer | 6.6 |

Examples 22 to 27

Using yet another batch of polymer, further granules containing Gasil 20OTP were prepared to the following formulations and gave the panel test results shown. The granule of Example 23 contained titanium dioxide incorporated during granulation.

| Example | 22 | 23 | 24 | 25 | 26 | 27 |
|---|---|---|---|---|---|---|
| DTI polymer | 21.0 | 21.0 | 19.2 | 16.0 | 17.4 | 14.5 |
| Gasil 200TP | 79.0 | 77.0 | 64.6 | 56.0 | 77.5 | 76.0 |
| Titanium dioxide | | 2.0 | | | | |
| Polyacrylic acid | | | | | 5.1 | 9.5 |
| Phthalic acid | | | 16.2 | 28.0 | | |

| Example | % DTI polymer content | Ingredients of granule | Average panellist ranking |
|---|---|---|---|
| Control | 0 | Gasil | 1 |
| 22 | 21.0 | Gasil/polymer | 2.8 |
| 26 | 17.4 | Gasil/polyacrylic acid/polymer | 3.2 |
| 23 | 21.0 | Gasil/$TiO_2$/polymer | 3.4 |
| 27 | 14.5 | Gasil/polyacrylic acid/polymer | 5 |
| 24 | 19.2 | Gasil/phthalic acid/polymer | 5.8 |
| 25 | 16.0 | Gasil/phthalic acid/polymer | 6.8 |

Examples 28 to 32

Granules with Titanium Dioxide Coating

Using the same batch of polymer as in Examples 22 to 27, granules were prepared to the following formulation (Example 28):

| | |
|---|---|
| DTI polymer | 18.6 |
| Gasil 200TP | 77.4 |
| Polyacrylic acid | 4.0 |

Further granules were prepared from the granules of Example 28 by coating with titanium dioxide in amounts of 1, 2, 3 or 5 parts per 100 parts of the Example 28 granule. The granules were subjected to the panel test described previously and the rankings were as follows:

| Example | Parts of $TiO_2$ per 100 parts of Example 28 granule | Average panellist ranking |
|---|---|---|
| Control | — | 1 |
| 29 | 1 | 2 |
| 30 | 2 | 3 |
| 28 | 0 | 4.4 |
| 32 | 5 | 5 |
| 31 | 3 | 5.2 |

These results indicate a preference for lower levels of titanium dioxide coating.

Examples 33 to 35

Granules were prepared on a pilot plant scale to the following formulations:

| Example | 33 | 34 | 35 |
|---|---|---|---|
| DTI polymer | 20.0 | 14.7 | 20.0 |
| Gasil 200TP | 75.6 | 74.3 | 75.6 |
| Polyacrylic acid | 4.4 | 11.0 | 4.4 |

The granules were prepared using a Fukae (Trade Mark) FS30 batch high-speed mixer/granulator and an APEX fluidised bed.

The silica was charged into the mixer/granulator and the DTI polymer, as a 40% aqueous solution, was added while operating the stirrer at 100 rpm and the chopper at 3000 rpm. The polymer and silica were mixed for 4 minutes at a stirrer speed of 250 rpm and a chopper speed of 3000 rpm. Polyacrylic acid, as a 48% aqueous solution, was then added while operating the stirrer at 100 rpm and the chopper at 3000 rpm. The mixture was granulated for 2 minutes at a stirrer speed of 250 rpm and a chopper speed of 3000 rpm. The resulting granules were then dried on the fluidised bed and sieved to a particle size range of 250–850 micrometres.

The granules were of good colour and showed good colour stability when incorporated in a concentrated zeolite-built non-bleaching detergent powder formulation.

The dye transfer inhibiting properties of the polymer granules of Examples 33 to 35 were tested against a control in which the polymer was incorporated into a wash liquor in liquid form. The test involved monitoring the transfer of Direct Red 80 dye (10 micromolar concentration) in wash liquors containing the following ingredients:

Linear alkylbenzene sulphonate

Nonionic surfactant ($C_{12}$–$C_{15}$ 7EO)

Sodium tripolyphosphate

Sodium carbonate at ratios of anionic surfactant to nonionic surfactant of 100:0, 90:10, 80:20, 60:40 and 0:100.

The polymers and granules were dosed in amounts calculated to give equal final polymer concentrations in the wash liquor of 0.00436 g/100 ml.

The results are shown in the following table. There was a small but not significant loss of dye transfer inhibiting activity.

| | polymer in granule | ΔΔE values of white monitors compared with control, at anionic:nonionic ratio of | | | | |
|---|---|---|---|---|---|---|
| Example | (wt %) | 100:0 | 90:10 | 80:20 | 60:40 | 0:100 |
| 33 | 20.0 | +0.36 | +1.98 | +2.07 | +3.29 | +3.64 |
| 34 | 14.7 | −0.36 | +1.71 | +2.84 | +4.32 | +5.65 |
| 35 | 20.0 | +0.61 | +2.41 | +2.01 | +4.42 | +4.05 |

COMPARATIVE EXAMPLES D AND E

Granules were prepared using the aluminosilicate Alusil ET as carrier. The formulations were as follows:

| Comparative Example | D | E |
|---|---|---|
| DTI polymer | 29.3 | 14.2 |
| Alusil ET | 68.0 | 67.2 |
| Titanium dioxide | 1.7 | |
| Polyacrylic acid | | 18.6 |

The granules of Comparative Example D turned green immediately on drying. The granules of Comparative Example E gradually turned green on drying.

What is claimed is:

1. A free-flowing granular polymer composition suitable for incorporation in a particulate detergent composition, the granular polymer composition comprising (a) a dye-transfer-inhibiting polymer having the general formula I:

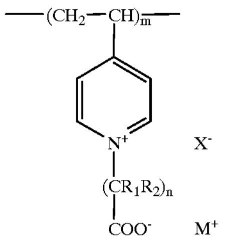

wherein m indicates the degree of polymerisation, X is an anion, $R_1$ and $R_2$ are independently hydrogen, alkyl or aryl, n is an integer within the range of from 1 to 5, and M is a cation;

(b) a carrier material comprising a silica.

2. A granular polymer composition as claimed in claim 1, wherein the dye-transfer-inhibiting polymer (a) is poly(4-vinylpyridine) sodium carboxymethyl betaine chloride, having the formula II:

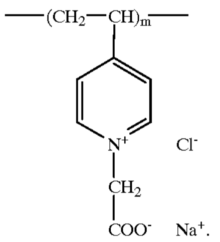

3. A granular polymer composition as claimed in claim 1, wherein the carrier material comprises a silica which is acidic.

4. A granular polymer composition as claimed in claim 3, wherein the silica has a 5% solution pH within the range of from 2.0 to 6.0.

5. A granular polymer composition as claimed in claim 1, wherein the silica has an iron content of less than 200 ppm.

6. A granular polymer composition as claimed in claim 5, wherein the silica has an iron content within the range of from 50 to 200 ppm.

7. A granular polymer composition as claimed in claim 1, wherein the carrier material comprises a silica in conjunction with a solid organic or inorganic acid.

8. A granular polymer composition as claimed in claim 7, wherein the solid acid is present as a coating or partial coating on the granule.

9. A granular polymer composition as claimed in claim 7, wherein the solid acid is an an aliphatic or aromatic dicarboxylic acid.

10. A granular polymer composition as claimed in claim 7, wherein the solid organic acid is a polymeric polycarboxylic acid.

11. A granular polymer composition as claimed in claim 1, which comprises a) from 5 to 50% by weight of the dye-transfer-inhibiting polymer, b) from 20 to 95% by weight, of silica, and c) from 0 to 60% by weight of a monomeric solid organic acid.

12. A granular polymer composition as claimed in claim 1, which comprises a) from 5 to 50% by weight of the dye-transfer-inhibiting polymer, b) from 20 to 95% by weight of silica, and c) from 0 to 15% by weight of a polymeric solid organic acid.

13. A process for the preparation of a granular polymer composition as claimed in claim 1, which comprises mixing and granulating the dye-transfer-inhibiting polymer in aqueous solution form, the silica, and optionally a solid organic or inorganic acid, in a high-shear mixer/granulator.

14. A process as claimed in claim 13, which comprises the steps of:

(i) mixing and granulating the dye-transfer-inhibiting polymer solution with silica to form granules;

(ii) mixing the solid organic acid with the granules formed in step (i) whereby the granules are coated or partially coated with the solid organic acid.

15. A particulate laundry detergent composition which comprises:

a) from 5 to 60 wt % of one or more organic detergent surfactants, b) optionally from 0 to 80% wt % of detergency builder, c) optionally other detergent ingredients, characterised in that it further comprises d) a granular polymer composition as claimed in claim 1, in an amount equivalent to a content of the polymer itself of from 0.01 to 10% wt %.

* * * * *